United States Patent [19]

Kramer

[11] Patent Number: 5,056,829

[45] Date of Patent: Oct. 15, 1991

[54] DEVICE FOR INTERCHANGEABLE CONNECTION

[75] Inventor: Marcel Kramer, Jona, Switzerland

[73] Assignee: Prazisions-Werkzeug AG, Riiti, Switzerland

[21] Appl. No.: 187,514

[22] Filed: Apr. 28, 1988

[30] Foreign Application Priority Data

May 11, 1987 [CH] Switzerland ........................ 1782/87

[51] Int. Cl.[5] ............................................ F16L 25/00

[52] U.S. Cl. ....................................... 285/12; 285/26; 285/137.1; 285/328; 285/353; 285/361; 285/906; 285/92

[58] Field of Search ...................... 285/361, 137.1, 26, 285/29, 12, 328, 353, 906, 92; 118/DIG. 3

[56] References Cited

U.S. PATENT DOCUMENTS

| | | | |
|---|---|---|---|
| 2,438,679 | 3/1948 | Parker | 285/137.1 |
| 2,576,942 | 12/1951 | Jakob | 118/DIG. 3 |
| 3,605,069 | 9/1971 | Dorrell | 285/361 X |
| 4,230,390 | 10/1980 | Wells | 285/361 X |
| 4,319,772 | 3/1982 | Weirich | 285/26 |

FOREIGN PATENT DOCUMENTS

| | | | |
|---|---|---|---|
| 61399 | 4/1968 | Fed. Rep. of Germany | 285/137.1 |
| 400768 | 10/1973 | U.S.S.R. | 285/361 |

*Primary Examiner*—Dave W. Arola

*Attorney, Agent, or Firm*—Antonelli, Terry, Stout & Kraus

[57] ABSTRACT

A device is suggested for the interchangeable connection of a projecting arm section (1) to an arm (2) of an internal treatment station for can bodies. The device comprises a locking member (8), by means of which the arm section (1), such as a spray arm, for example, is detachably mounted to the arm (2).

14 Claims, 2 Drawing Sheets

DEVICE FOR INTERCHANGEABLE CONNECTION

FIELD OF INVENTION

The present invention relates to a device for the interchangeable connection of a section of a can interior treatment arm to this arm, and use of the device for attachment of a can seam coating head.

BACKGROUND AND SUMMARY OF INVENTION

In can interior coating systems, various spray heads and, respectively, spray arms are utilized for coating purposes, namely for the application of powder varnishes as well as wet varnishes. More generally, the working station at the arm projecting into the interior of the can must be exchanged relatively frequently in can interior treatment systems, such as, for example, in systems for melting applied powder on the interior of the can.

Although in can interior coating systems used at present the spray arms can be interchanged, the exchanging procedure takes a relatively long period of time since all feed and discharge lines for the coating medium, for air, for current, etc., must be individually disconnected and, respectively, reattached before the new spray arm section can be placed on the arm of the coating system and there locked into place.

Therefore, it is an object of the present invention to provide a device making it possible to effect quick interchanging of such a section in a can interior treatment system.

According to the invention, this is attained with a device for the interchangeable connection at a section of an internal can treatment arm to this arm wherein the device comprises a quick-action coupling.

A device of this invention comprises preferably respectively one planar or curved contact surface at the section, such as, for example, at the spray arm, and at the arm of the system to which the section is connected, as well as at least one locking member pressing the contact surfaces together.

In order to attach the interchangeable section, such as, for example, the spray arm, in the correct position to the arm of the can interior treatment system, there are furthermore provided positioning members preferably at the contact surfaces, these members permitting the locking action of the locking member to take place only in a predetermined relative position of the two surfaces.

It is important in connecting the section, such as the spray arm, to the arm of the can interior treatment system to also establish the connection of the feed and discharge conduits, such as, for example, for the coating medium, for the current, for measuring instrument connections, and so forth. This is accomplished by operationally safe attachment of the connections between the arm and the section by the locking action with the aid of the locking member. This is done, for example, by providing that the conduits either are in sealing contact during the positionally correct joining of the contact surface, or exhibit plug connections which are plugged together during the joining of the contact surfaces.

It may happen during the rapid interchanging of the section that the contact surfaces are contaminated so that tight pressure contact between the two contact surfaces is made difficult. For this reason, and for establishing a flexible locking action, it is furthermore proposed to arrange at least one sealing ring, for example at the periphery of one of the contact surfaces in order to sealingly join the surfaces in the separating plane by the locking action. In this case, the contact surfaces need not be in direct contact in the pressed-together condition.

In order to press the contact surfaces against each other, it is suggested for the sake of simplification to utilize a sleeve nut as the locking member. Preferably, this sleeve nut is designed in such a way that even a rotation by a relatively small angle already ensures the locking action.

In a further version of an embodiment, it is suggested to utilize a bayonet catch, the locking member forming part thereof.

In another version of the embodiment, it is proposed to fashion the locking member as a non-slip plug. In this arrangement, the length of the plug or, respectively, the corresponding socket must be designed so that, in the plugged-in condition, any deflection of the section relatively to the arm is impossible. Preferably, in this connection, either the surface of the plug or the inside of the socket is fashioned with a material having high surface friction, thus producing a maximally high frictional resistance between the socket and the plug. The material involved can be, for example, a synthetic resin or elastomeric materials. Pulling apart of socket and plug is possible only by exertion of an external force.

The device according to this invention is suited, in particular, for the attachment of a can seam coating head as a section to an arm of a can interior coating system.

The device according to the invention will be described hereinbelow by way of example with reference to the accompanying figures.

DETAILED DESCRIPTION OF DISCLOSED EMBODIMENTS

Figure 1:
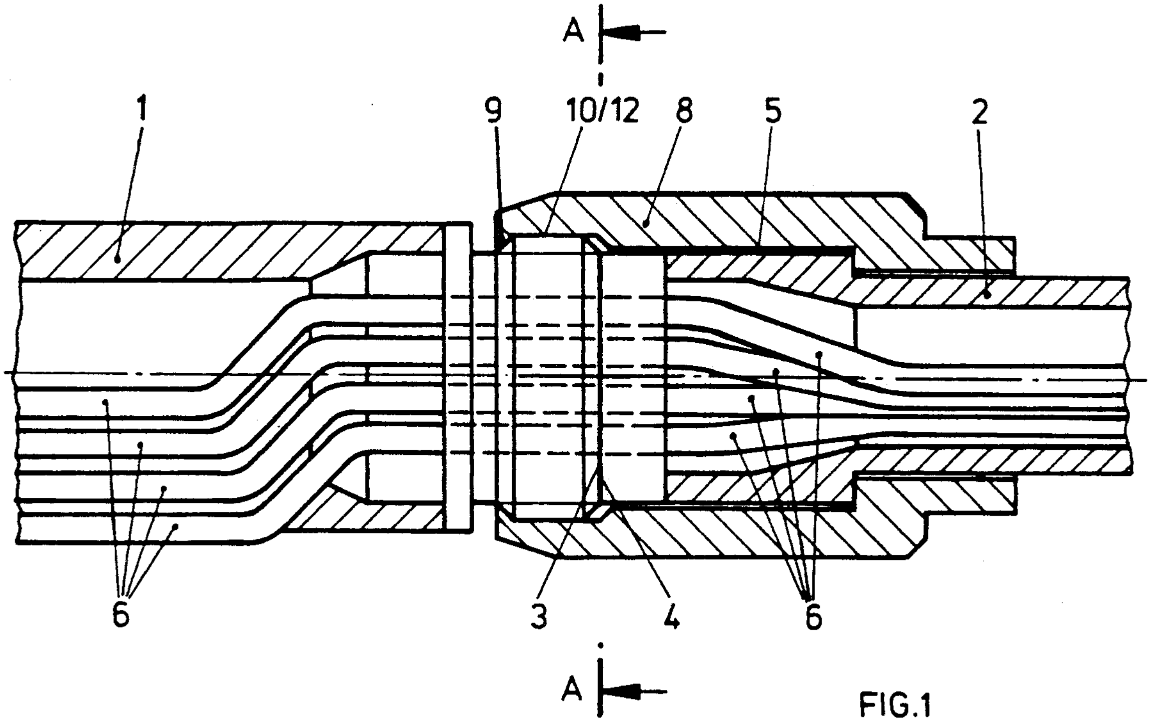
FIG. 1 shows a longitudinal cross section of the device according to the invention.

FIG. 1 is a quick-change coupling between a spray arm 1 and a coupling arm 2 of a can seam coating system. Contact surfaces 3 and 4 are provided at the spray arm 1 as well as at the coupling arm 2 at the end face, these surfaces being pressed together A sleeve nut 8 is rotatably arranged on a sliding seat 5 of the coupling arm 2, this sleeve nut engaging with an internal thread 10 into an outer thread 12 of the spray arm 1. The nubs 9 projecting at the sleeve nut can be pushed, for example, over the outer thread 12 of the spray arm 1 in such a way that they are mounted resiliently, for example through axial slots at the sleeve nut 8.

Feed and discharge lines 6 between the spray arm 1 and the coupling arm 2 are sealingly connected via the contact surfaces 3 and 4.

During exchange of the spray arm 1, the sleeve nut 8 is loosened until the two contact surfaces 3 and 4 of the spray arm 1 and the coupling arm 2 can be separated. The spray arm 1, which has served, for example, for coating relatively large areas, is now removed and replaced, for example, by a spray arm for coating relatively small areas. The new spray arm 1 is placed with its contact surface 3 against the contact surface 4 of the coupling arm 2. At this point, the sleeve nut 8 is threaded in place, and the two contact surfaces 3 and 4 are placed under pressure.

By positioning pins 14 (FIG. 2) and corresponding bores at each of contact surfaces 3 and 4, assurance is obtained that the two contact surfaces 3 and 4, before they can be pressed together, must be placed against each other in such a way that the corresponding feed and discharge lines 6 are aligned. After locking the new spray arm 1 in place by means of the sleeve nut 8, the line connections are established so that they are safe for operation, by a tensile action of the sleeve nut 8, such as sealingly tight, and the new spray arm 1 can be placed in operation.

Figure 2:
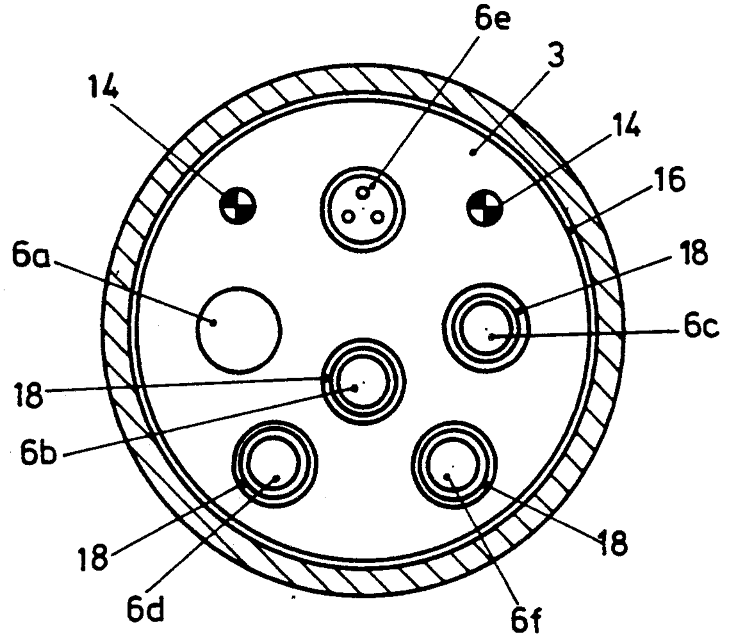
FIG. 2 is a top view of a contact surface of a section along line A—A of FIG. 1.

As can be seen from FIG. 2, the contact surface 3 comprises a sealing ring 16 on its periphery. An electrical connection 6e is established by a commercially available plug connector and a corresponding socket in the opposite contact surface. The line 6a is a lightguide cable, for example. Conduit 6b is provided for transporting powder varnishes and conveying air, conduit 6c for suction removal of the powder that has not adhered. Conduit 6d is intended for feeding wet varnish to make it possible to exchange a powder coating head against a wet varnish coating head as the section. The conduit 6f is provided for exposing, in a coating head in the form of a section with high-voltage electrodes, the latter to air so that they do not become encrusted by coating medium. For sealing the connection of conduits 6b, 6c, 6d, 6f, respectively one gasket 18 is provided where the conduits terminate into the surface 3 or 4, ensuring a tightly sealed coupling.

If, now, the spray arm is placed with the contact surface 3 onto the corresponding contact surface of the coupling arm, then the positioning pins 14 are guided into the corresponding recesses in the contact surface of the coupling arm. On account of the positioning effect of the pins/recesses, corresponding lines 6 are aligned at the contact faces and are connected, e.g. sealingly, for safe operation during the locking step.

Figure 3:
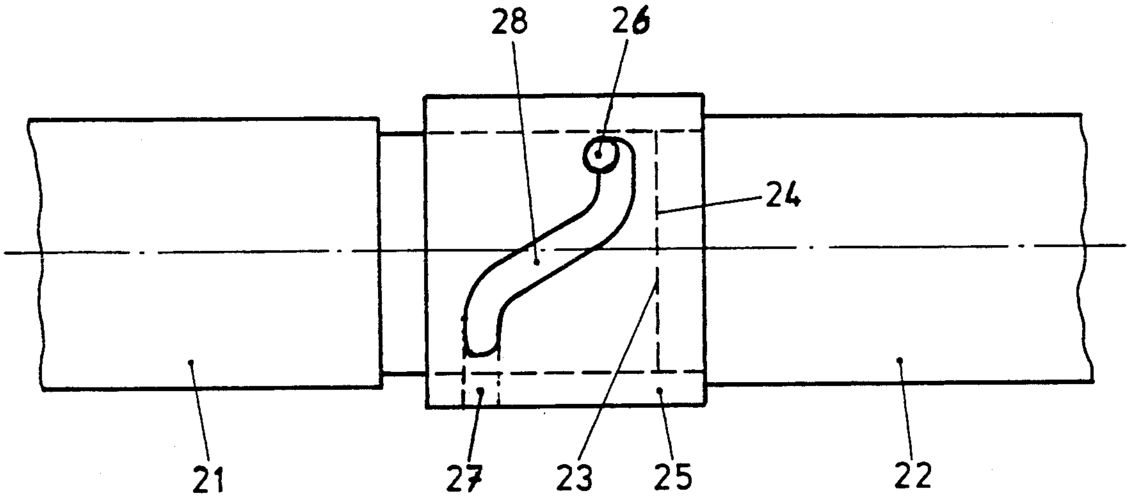
FIG. 3 shows parts of a bayonet catch as the locking member.
Figure 4:
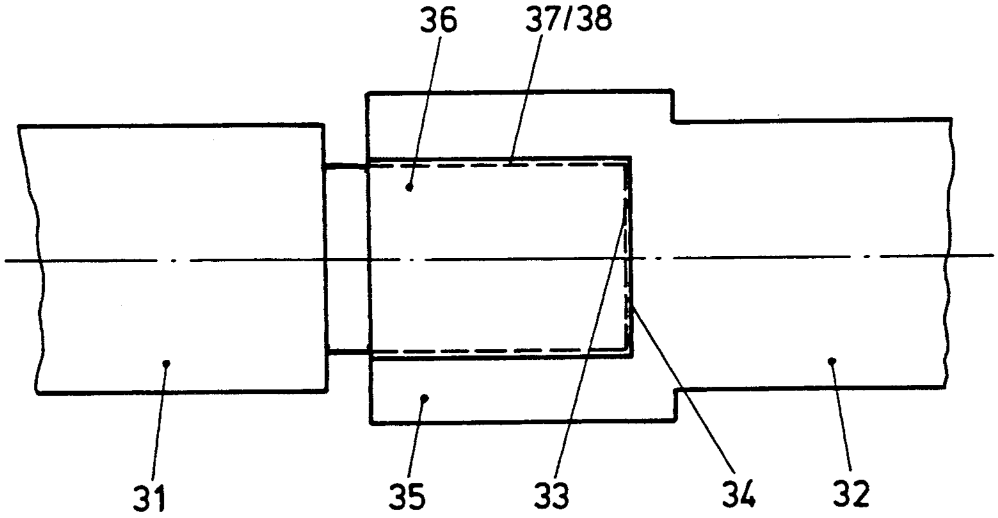
FIG. 4 shows a non-slip plug as the locking member.

FIGS. 3 and 4 show additional possibilities for connecting a section to an arm by means of a quick-acting coupling.

In FIG. 3, a section 21 is locked onto an arm 22 with the use of a bayonet catch. A pin 26 of section 21 is introduced through an insert recess 27 into a guide 28 of a cap ring 25 of the arm 22. By rotating the section 21, the pin 26 slides along the guide 28, and the two contact surfaces 23 and 24 are pressed against each other. By means of a recess in the guide 28 located at the end, the pin 26 is fixed in the end position shown in FIG. 3 whereby the two contact surfaces 23 and 24 remain in pressing engagement.

In FIG. 4, a plug connection is illustrated between a section 31 and an arm 32. A plug 36 of section 31 is introduced into a socket 35 of the arm 32 until the contact surfaces 33 and 34 come into mutual contact. The surface 37 of the plug 36, as well as the inside 38 of the socket 35, are coated with a material exhibiting a high surface friction resistance. Due to this high surface friction resistance, the plug 36 and the socket 35 can be unlocked from the locked position shown in FIG. 4 solely by external application of force, for example by external pulling apart of the two elements.

The device of this invention is generally applicable to any kind of internal treatment systems where there is the necessity of the interchangeable connection of an arm section.

I claim:

1. An apparatus for internal coating of cans comprising a treatment arm for the inside coating of cans, said treatment arm including a plurality of conduits extending therethrough for transporting coating material to and from cans being coated, said treatment arm including a section of the arm which can be connected to and disconnected from the arm, and a quick-action coupling for connecting and disconnecting said section to the arm, wherein said quick-action coupling includes a contact surface at the section and a contact surface at the arm, each of said contact surfaces having a plurality of openings in communication with corresponding ones of said conduits for transporting coating materials to and from cans being coated, the openings in the respective contact surfaces being aligned with one another when said section is connected to said arm, wherein said coupling further includes at least one locking member for pressing the contact surfaces together and wherein the locking member comprises a non-slip plug connection including a plug and a socket with at least one of the outside surface of the plug and the inside surface of the socket being coated with a rough material to provide a high slide resistance between the plug and socket.

2. Apparatus according to claim 1, wherein positioning members are provided at the contact surfaces for the relative position of arm and section.

3. Apparatus according to claim 1, wherein service connections between the arm and the section are connected safe for operation by means of of the locking member.

4. Apparatus according to claim 1, wherein at least one sealing ring is arranged on at least one of the contact surfaces in order to be pressed sealingly between the surfaces after locking.

5. Apparatus according to claim 1, wherein the contact surfaces are planar.

6. Apparatus according to claim 1, whereas the contact surfaces are curved.

7. An apparatus for internal coating of cans comprising a coupling arm having a plurality of conduits extending therethrough for transporting different coating materials to and from cans being coated for different applications, said plurality of conduits including respective conduits for transporting powder and liquid coating materials, a plurality of different spray arm sections for different applications which can be respectively connected to and disconnected from the coupling arm to form a treatment arm for the inside coating of cans, said plurality of different spray arm sections including a powder coating head spray arm section and a liquid coating head spray arm section, and a quick-action coupling for connecting and disconnecting the respective spray arm sections to the coupling arm, wherein said quick-action coupling includes a contact surface at each spray arm section and a contact surface at the coupling arm, each of said contact surfaces having a plurality of openings which communicate with corresponding ones of said conduits for transporting coating materials to and from cans being coated when the respective spray arm sections are connected to the coupling arm, the openings in the respective contact surfaces of the spray arms being aligned with corresponding openings of the contact surface of the coupling arm when connected to the coupling arm, and wherein said coupling further includes at least one locking member for pressing the contact surfaces of the respective spray arm sections and the contact surface of the coupling arm together.

8. Apparatus according to claim 7, wherein positioning members are provided at the contact surfaces for relatively positioning the contact surfaces of the respective spray arm sections with the contact surface of the coupling arm during connecting.

9. Apparatus according to claim 7, wherein the at least one locking member is mounted on the coupling arm.

10. Apparatus according to claim 7, wherein the at least one locking member is a sleeve nut.

11. Apparatus according to claim 7, wherein the at least one locking member is part of a bayonet catch.

12. Apparatus according to claim 7, wherein at least one sealing ring is arranged on at least one of the contact surfaces in order to be pressed sealingly between the contact surfaces after locking.

13. Apparatus according to claim 7, wherein service connections between the coupling arm and the respective spray arm sections are connected safely for operation by means the at least one locking member.

14. An apparatus for internal coating of cans comprising a coupling arm having a plurality of conduits extending therethrough for transporting different coating materials for different can coating applications, said plurality of conduits including respective conduits for transporting at least first and second different coating materials, a plurality of different spray arm sections for different can coating applications which can be respectively connected to and disconnected from the coupling arm to form a treatment arm for the inside coating of cans, said plurality of different spray arm sections including first and second different coating head spray arm sections for different can coating applications, said first spray arm section being adapted to spray said first coating material and said second spray arm section being adapted to spray said second coating material, and a quick-action coupling for connecting and disconnecting the respective spray arm sections to the coupling arm, wherein said quick-action coupling includes a contact surface at each of the first and second spray arm sections and a contact surface at the coupling arm, said contact surface of the coupling arm having a plurality of openings such which communicate with corresponding ones of said plurality of conduits and said contact surfaces of the first and second spray arm sections having openings therein for alignment with openings of the contact surface of the coupling arm when connected to the coupling arm such that first coating material can be conveyed to the first spray arm section and second coating material can be conveyed to the second spray arm section when the first and coupling arm, and wherein said coupling further includes at least one locking member for pressing the contact surfaces of the respective spray arm sections and the contact surface of the coupling arm together.

* * * * *